United States Patent [19]
Pierret

[11] 3,733,565
[45] May 15, 1973

[54] EQUALIZER FOR LINEARIZING A TRANSMISSION CHANNEL PHASE-FREQUENCY RESPONSE UTILIZING ODD AND EVEN ORDER ALL-PASS NETWORKS

[75] Inventor: Jean Marc Pierret, Falicon Nice, France

[73] Assignee: International Business Machines Corporation, Armonk, N.Y.

[22] Filed: June 23, 1971

[21] Appl. No.: 155,930

[30] Foreign Application Priority Data

July 9, 1970 France ..............................7026336

[52] U.S. Cl. ..................................333/28, 333/70
[51] Int. Cl. ...........................................H03h 5/00
[58] Field of Search ...............................333/28, 70

[56] References Cited

UNITED STATES PATENTS

| | | | |
|---|---|---|---|
| 3,122,716 | 2/1964 | Whang | 333/28 R |
| 3,609,599 | 9/1971 | Standley | 333/28 R |
| 3,449,696 | 6/1969 | Routh | 333/28 X |
| 2,853,686 | 9/1958 | Nordstrom et al. | 333/70 X |

*Primary Examiner*—Herman Karl Saalbach
*Assistant Examiner*—Saxfield Chatmon, Jr.
*Attorney*—Robert B. Brodie et al.

[57] ABSTRACT

An equalizer for linearizing a non-linear phase-frequency characteristic and formed from successive all-pass filter stages in which at least first and second odd order filter stages align groups of frequencies along respective linear phase-frequency approximation through the introduction of appropriate symmetrical phase shifts. A third even order filter stage linearly superimposes the linear approximations by way of an antisymmetrical phase shift.

7 Claims, 16 Drawing Figures

EQUALIZER FOR LINEARIZING A TRANSMISSION CHANNEL PHASE-FREQUENCY RESPONSE UTILIZING ODD AND EVEN ORDER ALL-PASS NETWORKS

BACKGROUND OF THE INVENTION

This invention relates to an apparatus for linearizing the phase shift versus frequency response of a data or telephone transmission channel, said apparatus being formed from one or more filter stages having transfer functions of predetermined frequency polynomial degree or order.

In data or telephone transmission one of the channel characteristics that limits transmission rate is the phase - frequency distortion. By this, it is meant, the distortion due to the deviation from direct proportionality of phase shift versus frequency of the several frequency components of an applied electrical signal. Now consider the effect such a linear phase - frequency characteristic has upon the n harmonically related frequencies of any periodic waveform. The $n^{th}$ harmonic will suffer a phase shift $n$ times that of the fundamental. Since the period of the $n^{th}$ harmonic is $1/n$ times that of the fundamental should be the same. Thus, generally speaking, the time delay of any transmission path varies as the slope of its phase - frequency characteristic. This assumes, of course, a channel, or for that matter a filter transfer function in which the relative amplitude does not vary with frequency. At this point, the term transfer function H(s) of any circuit or system is defined as the ratio of output signal to input signal as a function of certain network parameters such as impedances, frequency, etc., were s is the generalized frequency.

One well known network which possesses the properties of relative amplitude invariance to frequency is called an "all pass" network.

To appreciate some of the properties of this network, a brief inquiry is made into a low order arrangement. This includes an excursus into phase and frequency.

The "all pass" transfer function has a magnitude K that is constant for all frequencies. The networks are denominated "even" or "odd" order according to the degree of the rational polynomial in the numerator or denominator of the transfer function. A typical "even order" function may be expressed as $$H(s)=\left\{K\frac{s^2-\alpha s+\omega_0^2}{s^2+\alpha s+\omega_0^2}\right\}$$

where $\alpha + \omega_0$ are positive constants.

This means that $$\left|\frac{s^2-\alpha s+\omega_0^2}{s^2+\alpha s+\omega_0^2}\right|\approx 1$$

to satisfy the "all pass" requirement.

$$\text{Now let } s=j\omega$$
$$\text{Then } H(j\omega)=K\left\{\frac{(\omega_0^2-\omega^2)-j\alpha\omega}{(\omega_0^2-\omega^2)+j\alpha\omega}\right.$$

Let $\theta$ represent the phase angle between the real component $(\omega_0^2 - \omega^2)$ and the corresponding imaginary component $(j\alpha\omega; -j\alpha\omega)$. This may be vectorally represented as

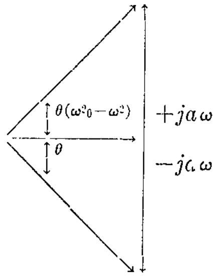

From this, it is apparent that $$\theta = -\tan^{-1}(\alpha\omega)/(\omega_0^2-\omega^2)$$

The total phase shift $\phi$ between output and input is equal to $-2\theta$ i.e., $$\phi = 2\theta = -2\tan^{-1}(\alpha\omega)/(\omega_0^2-\omega^2)$$

From a design view point, it is recognized that the coefficients of the middle term of the transfer function i.e., $\alpha$ are not identical. Also the function $H(\omega)$ may be represented by $$(s^2 - B\alpha S + \omega_0^2)/(S^2 + \alpha S + \omega_0^2)$$

In this form the numerator still approximates a second order damped resonant system and presents to the designer two design variables that of the damping factor $B$ and natural frequency $\omega_0$.

While the properties have been known for some time, the lack of practical implementation of "all pass" networks has retarded their employment in the filter art. This may have been occasioned by the relative high cost of the precision passive components. This disadvantage has been remedied in part by the teachings in the copending application Ser. No. 050500, filed on June 29, 1970, entitled "Second Order R-C Equalizer Using One Operational Amplifier" in the name of W. G. Crouse and L. C. Haas. Further reference to "even" and "odd" order all-pass networks is briefly made in "Synthesis of Passive Networks" by Ernst A. Guillemin, John Wiley and Sons, New York, 1957 L.C. 57–8886 at pages 513 and 626 in a discussion of the physical realizability of transfer functions based upon the lattice. Also, "even" order functions are shown in the IBM Technical Disclosure Bulletin, Vol. 13, No. 11 at pages 3419–20, April, 1971. In this reference, successive "even" order filter stages form a delay equalizer in which individual stages may be electronically removed from the equalizer for testing purposes. In subsequent discussion, attention is primarily related to the phase $\phi$ versus frequency ($\omega$,F) characteristic. Consequently, the transfer function $H(\omega)$ will be referenced generally and not specially.

SUMMARY OF THE INVENTION

It is an object of this invention to devise an equalizer for linearizing the phase versus frequency response characteristics of a transmission channel, the apparatus being formed from one or more "all pass" filter stages having transfer functions of predetermined frequency polynomial degree or order. More particularly, it is the object to secure the phase alignment of several predetermined frequencies as an index of the phase - frequency linearity.

The foregoing objects of this invention are satisfied by an equalizer embodiment formed from successive all pass filter stages in which at least a first and second filter stage are of odd order for aligning groups of frequencies along respective linear phase - frequency approximations. A third filter stage of even order linearly aligns by way of superposition the first and second approximations.

Each all pass filter stage can have its output to input signal ratio termed a transfer function $H(\omega)$ represented by rational polynomials of frequency with constant coefficients. Such polynomials can be factored into products of complex frequency terms $\omega^2 - \omega_i^2$. As previously mentioned when discussing the polynomial of the second degree even order, the frequency terms in turn can be partitioned into so called real (resistive) R and imaginary (reactive) X parts. The imaginary or reactive component can be related to $H(\omega)$ as $$X = H(\omega)\left[\frac{\pi(\omega^2 - \omega_i^2)}{\pi(\omega^2 - \omega_j^2)}\right]$$

Those values of angular frequency $\omega = \omega_i$ or $\omega = \omega_j$ which reduce the function to singularities are termed "pivots". One of the properties of each filter stage is that at the "pivot points" the phase angle is always a multiple of $\pi$ radians. Now the phase shift $\Delta\phi$ introduced by the stage varies as the arctan $$\left[\frac{H(\omega)}{R}\ \frac{\pi_1^{n}(\omega^2 - \omega_i^2)}{\pi_1^{m}(\omega^2 - \omega_j^2)}\right]$$

Referring to the arctan function, an odd order filter stage arises when $n-m$ is one. Likewise an even order stage occurs when $n-m$ is zero. Now the angular frequencies $\omega$ are related to frequency F by $\omega = 2\pi F$, $\omega_i = 2\pi F_i$, $\omega_j = 2\pi F_j$ where for the pivot points $(\Delta\phi)\ i = 2i\pi$ and $(\Delta\phi) j = (2j-1)\pi$ for $i, j, = 1, 2$, etc.

The invention contemplates linearizing a phase - frequency characteristic by aligning a group of frequencies along a linear approximation to the original characteristic. The alignment consists of introducing sufficient delay to alter the characteristic so that the frequencies of the characteristic represented by the pivot points in the all pass filter arctan function can be connected by a line of constant slope. For a highly non-linear characteristic, it has been found expedient to use successive odd order all pass filter stages to separately align different groups of frequencies. To assist in the final alignment, it is further expedient if successive stages have some common or overlapping pivot points. The piecewise linearization by odd order stages results in a substantially straightened characteristic approximated by lines of different slopes. Lastly, an even order all pass stage is used to align the separate linear approximations.

The odd order all pass networks introduce a "symmetrical" phase shift.

This phase shift is measured along the phase ordinate between the linear approximation and the phase characteristic. The linear approximation is obtained by connecting two extreme frequencies (pivot points) of the characteristic and an intermediate frequency (i.e., arithmetic means). The term "symmetrical" means that the phase shift introduced will be nearly the same in magnitude and direction along the frequency range of interest. Similarly, the even order networks introduce an antisymmetrical phase shift. In this regard, the phase shift will be the same in absolute magnitude but of opposite direction as measured from the intermediate frequency.

FIG. *2a* features an all-pass filter stage having a positive resistive portion compensated by negative resistance circuits.

Figure 3:
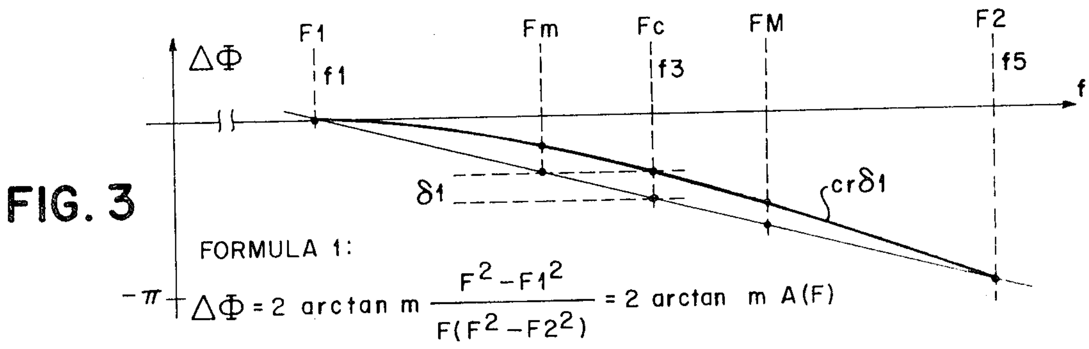

FIG. 3 exhibits the symmetrical phase shift of an order 3 filter stage.

FIG. *4a* exhibits the symmetrical phase shift of an order 5 filter stage.

FIG. *4b* shows the corresponding positional relationship of the phase characteristic of the order 3 filter stage with that of the order 5 stage of FIG. *4a*.

Figure 5:
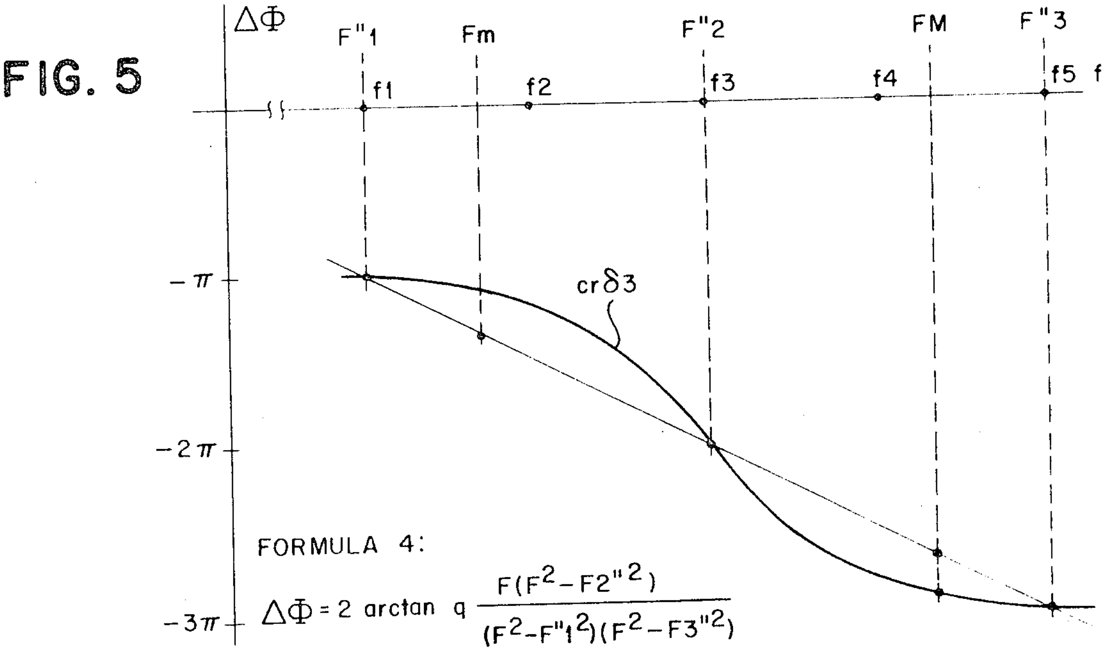

FIG. *4c* represents the combined order 3 and order 5 phase characteristics. FIG. 5 is the antisymmetrical phase shift of an order 4 filter stage.

Figure 2:
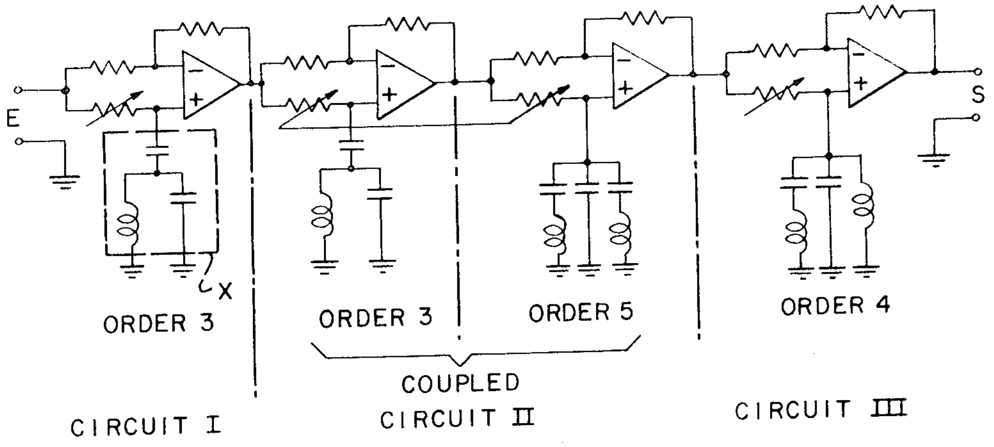
FIG. 2 shows one embodiment of the invention utilizing successive odd order and even order filter stages.
Figure 2A:
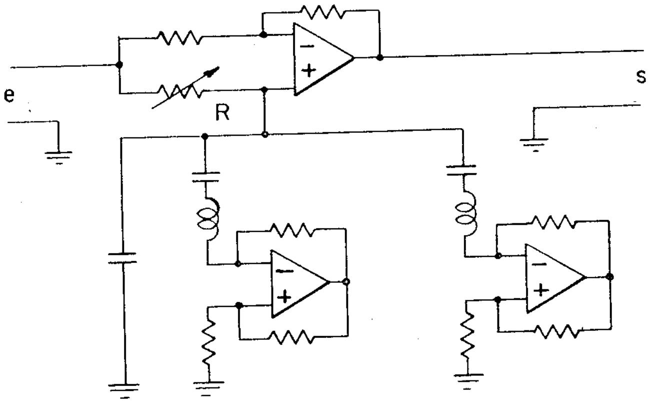

FIGS. 6 – 9 show the successive steps in phase alignment of the embodiment of FIG. 2.

Figure 13:
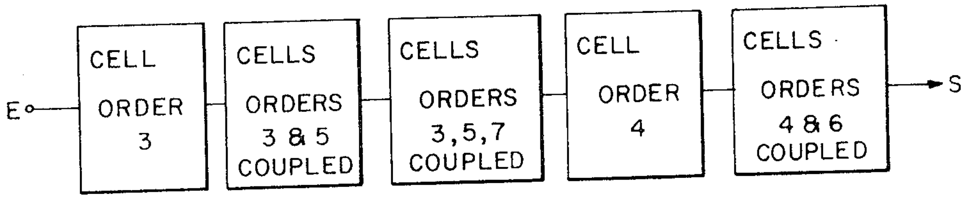
Figure 10:
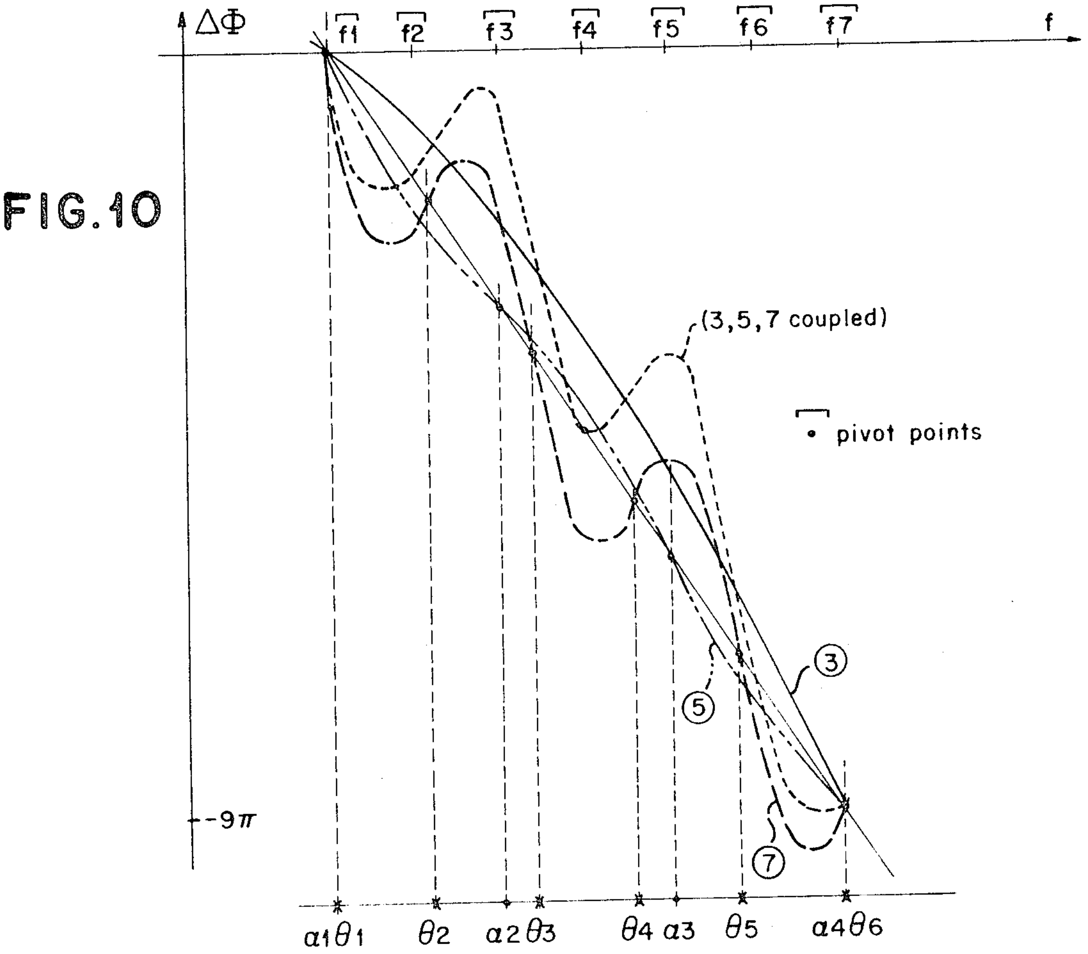
Figure 11:
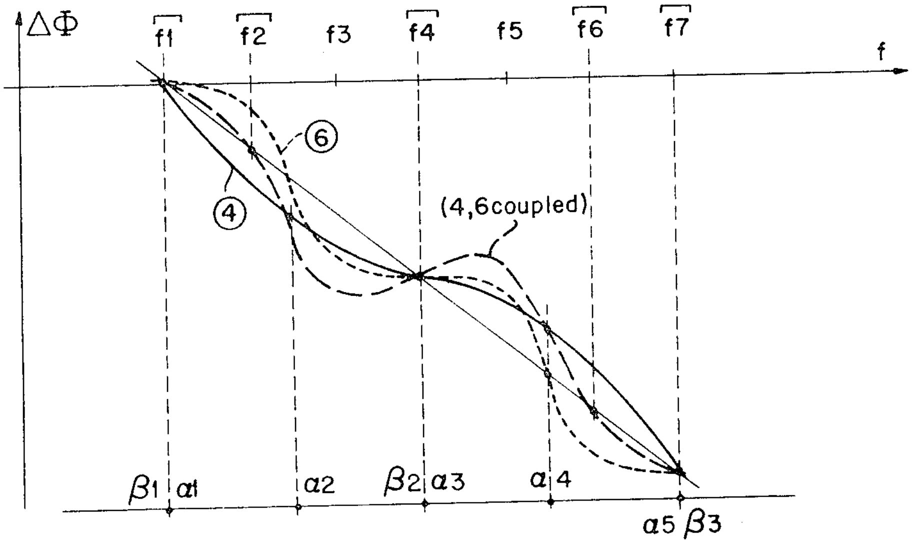
Figure 9:
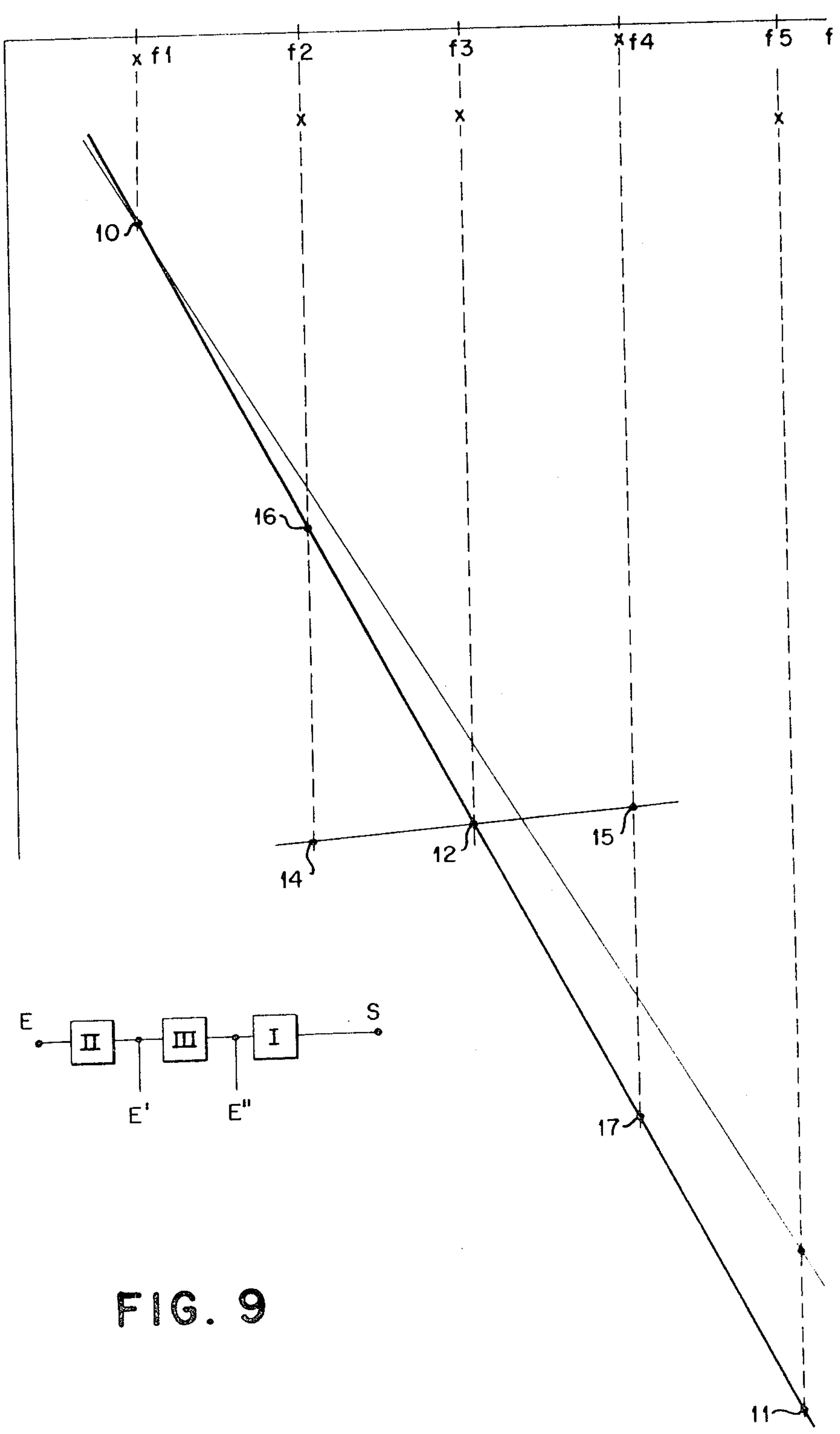
Figure 12:
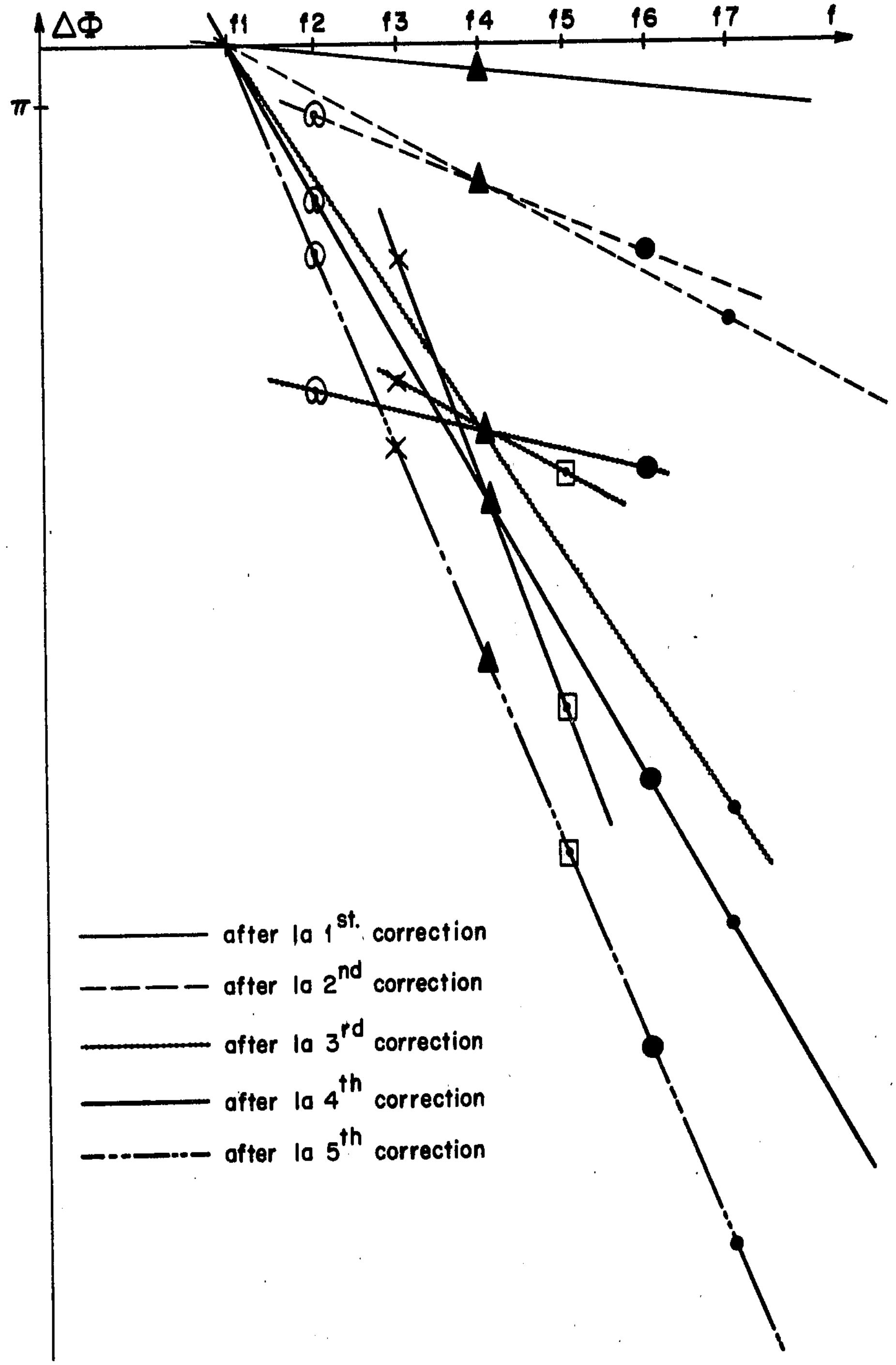

FIGS. 10 – 12 relate to the phase alignment of the embodiment found in FIG. 13.

FIG. 13 show a second embodiment of the invention utilizing odd and even order filter stages.

DESCRIPTION OF THE PREFERRED EMBODIMENT

Figure 1:
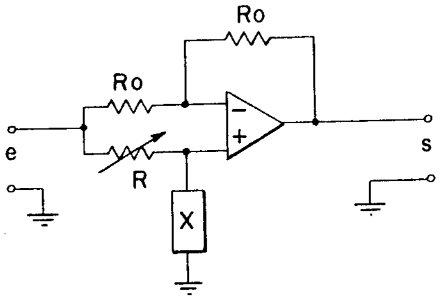
FIG. 1 is a schematic diagram of a simple all-pass filter stage using an operational amplifier.

Referring now to FIG. 1, there is shown a schematic diagram of an all-pass filter stage. This stage comprises an operational amplifier OPAM, resistive elements $R_0$ and R, and a reactive impedance network X. The reactive impedance X is of the dipole form. That is, its impedance function can be factored as complex conjugate impedance $(\omega^2 - \omega_1^2)\ (\omega^2 - \omega_2^2)$.

The nature of dipole X determines the number of pivot points, and the variation of $\Delta\phi$ versus the frequency for a given R. Thus, various types of filter stages are obtained. Such stages are called stages of the third order, fourth order, fifth order, etc. This order notion results from definitions in the study of basic all pass networks differing from one another in dipole X. The differences were particularly in the impedance mathematical poles of this dipole. In a more simple way, it should be noted that for an all pass filter stage, the number of pivot points is one unit below the order number. Relatedly, FIG. 2 shows a series of third, fourth, and fifth order stages embodying the invention.

For multiple reactances the constitution of dipole X becomes complicated. It is not purely reactive. That is, a positive real (resistive) component is exhibited. One can consider the possibility to compensate its ohmic section by negative resistance circuits now produced more easily by using new techniques. Such a compensation is shown in FIG. *2a*. This is a schematic diagram of an order 5 stage with correction by means of negative resistance elements. It should be noted that, nevertheless, the whole stage remains sufficiently and uniformly dampened so that parasitic oscillations are avoided. Such compensation can be applied to a stage of any order. The necessity for this increases with the order of the filter stage.

An order 3 filter stage (one example of which is given in FIG. 2) has a phase curve showing two pivot points at frequencies F1 and F2 and introduces a phase shift given by formula 1 indicated in FIG. 3, where m is a variable coefficient proportional to 1/R. Such a filter stage may be used to adjust phase in a frequency range by ensuring the correspondence of the extreme frequencies of this band with F1 and F2. Curve Cr δ1 gives the shape of the phase - frequency characteristic curve and corresponds to a particular use in the scope of the device of FIG. 2. In the same way, FIG. 4a relates to an order 5 filter stage. This type of stage encompasses four pivot frequencies F'1, F'2, F'3, F'4. The phase shift introduced thereby is given by formula 2 (FIG. 4a) where n is a coefficient which can be compared to coefficient m of formula 1 (FIG. 3).

FIG. 5 relates to a fourth order all pass filter stage. This type of stage comprises three pivot frequencies F''1, F''2, F''3. It introduces a phase shift given by formula 4 (FIG. 5), where q is a coefficient which can be compared to coefficients m and n of the previous formula. Curve Cr δ3 gives the shape of the phase - frequency characteristic.

Before proceeding further, it is necessary to define two notions: the notion of "symmetrical phase shift" or "phase shift symmetry". If one considers FIG. 3, frequencies Fm and FM are symmetrical with respect to central frequency Fc for a determined function $\Delta\phi(F)$. For example, for the curve CR δ1, it appears that the shift between the phase shift given by the circuit and the linear shift is almost the same in absolute value and in the same direction for the points corresponding to Fm and FM. Such a phase shift is called "symmetrical phase shift". It is possible to make the same observation with the phase shift given by an order 5 stage in FIG. 4a.

Now, one has to consider the phase shift given by an order 4 stage shown in FIG. 5. Frequencies Fm and FM are symmetrical with respect to central frequency F''2. The change between the phase shift given by the circuit and the linear shift is almost the same in absolute value but it is of opposite direction. Such phase shift is called "antisymmetrical phase shift". Stages or groups of filter stages giving a "symmetrical phase shift" are called "symmetrical type stages"; in the same way, filter stages or groups of stages giving "antisymmetrical phase shifts" are called "antisymmetrical stages".

It is possible to associate several of these stages by selecting their pivot points judiciously while keeping their variable parameters independent one from the others. If on the contrary, y stages are of same type or of various types, by applying (y–1) additional conditions, (y–1) relations will finally be obtained between y coefficients. Consequently, an all pass type circuit with new properties will be obtained both with respect to the pivots as well as to the "symmetry" or "antisymmetry" of the phase shift given by said circuit. This new circuit will still have one degree of freedom as does a single stage. When considering, for example, an order 3 stage and an order 5 stage, if one designates by $\Delta\phi 3x$ and $\Delta\phi 5x$ the phase shift given by them respectively at a given frequency Fx, it is possible to have the total phase shift $\Delta\phi x$ constant as R varies. Illustratively, $\Delta\phi x = \Delta\phi 3x + \Delta\phi 5x = 2K$, which gives from formula 1 and 2. $2 \arctan mAx + 2 \arctan nBx = 2K$. Let $Ax = A(Fx)$ and $Bx = B(Fx)$ from which formula 5 is obtained $$(mAx + nBx)/(1+mn\, AxBx) = \tan K \quad (5)$$

This is a relation between m and n.

Figure 4A:
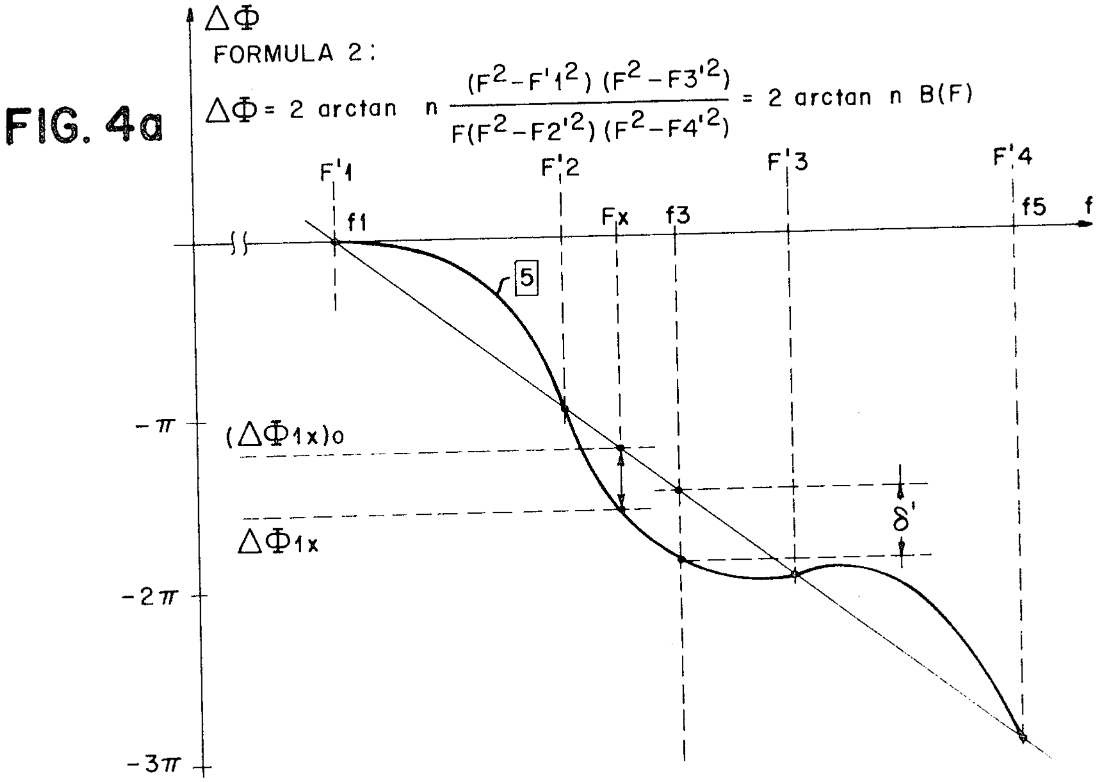
Figure 4B:
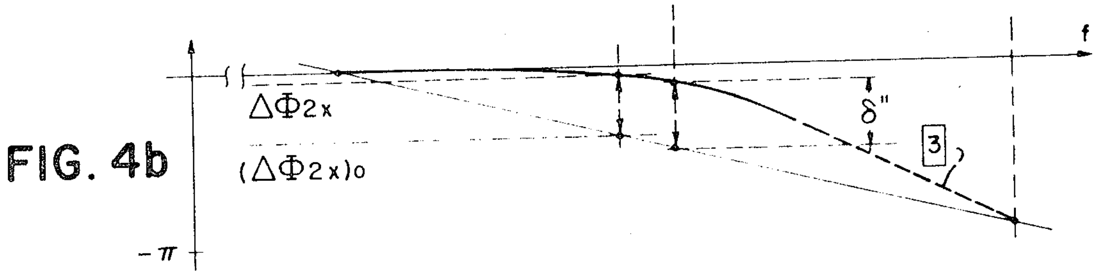
Figure 4C:
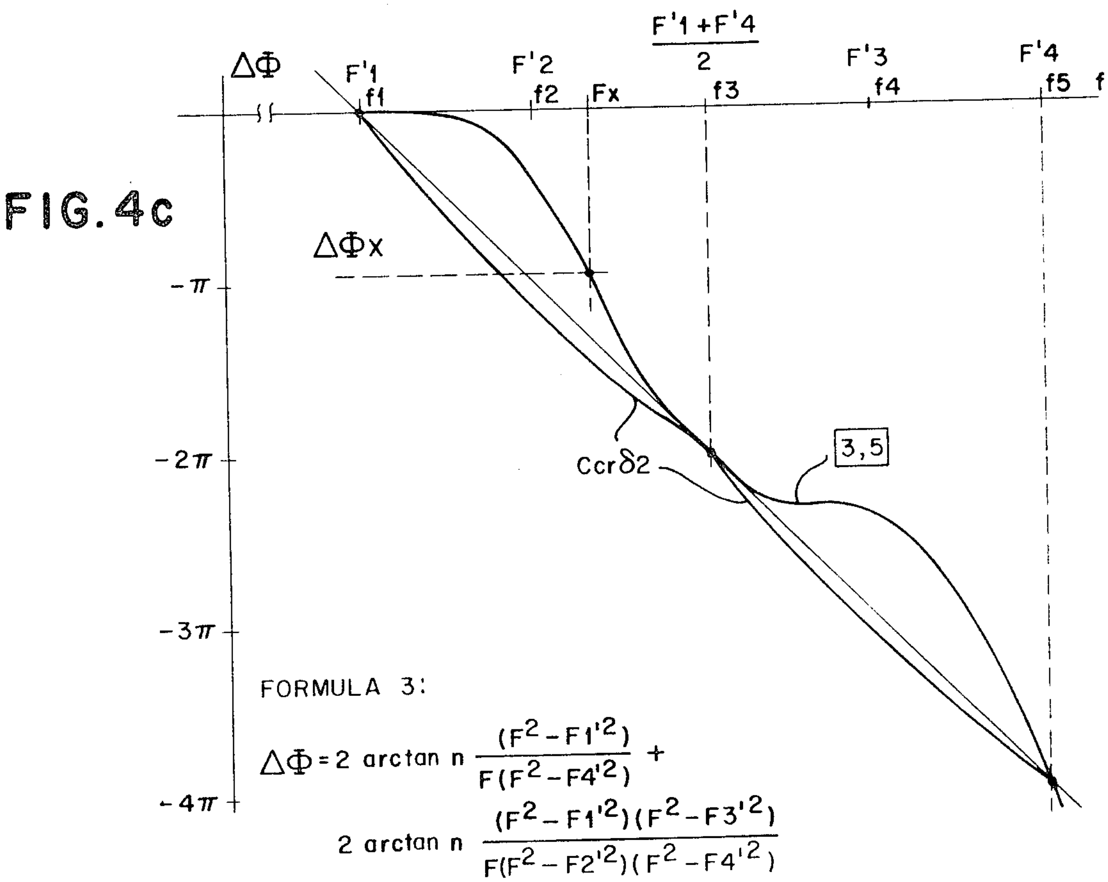

In the case when the extreme pivots are the same, F1 = F'1 and F2 = F'4, when $$Fx = (F'1 + F'4)/2 = Fc$$

and if a permanent compensation is wanted for shift δ' and δ'' as they appear on associated FIGS. 4a and 4b (corresponding respectively to the combined order 5 and order 3 stages), is obtained a circuit the pivot points of which are those given on FIG. 4c, the phase shift of which, in $(F'1 + F'4)/2$ is $2\pi$. The equation (5) above becomes $m\,Ac + n Bc = 0$ $$m/n = -Bc/Ac = \gamma = \text{constant}$$

In this case, the relationship between m and n is very simple. This allows an easy coupling between the physical elements, the variations of which involve the variations of m and n. These elements correspond to the variable resistances R of each stage. In FIG. 2, these variable elements have been schematically shown in potentionmetric form; any equivalent form such as, for example, the switching of resistances in or out, may be adopted. The circuits for carrying out said connection or variation may be of any type and their control may be analog or digital. This remark is not restrictive and applies to all possible uses of the invention.

To come back to the combination stage formed from an order 3 stage and of an order 5 stage, it is difficult to define the order of such a circuit. Nevertheless, as it is composed of odd order stages we say that this circuit is of "odd order". Similarly, circuits composed of even order stages will be found and they will be defined as being of "even order".

Concerning the combined order 3 and order 5 stage, it appears that the phase shift is a "symmetrical" phase shift as shown by the curves of FIG. 4c. It is given by formula 3 of the same figure.

Filter stages of either the simple or complex type enable phase correction. In order to obtain a linear phase shift between several consecutive frequencies; the phase values for these frequencies are said to be "linear" because they lie upon the same straight line.

Figure 6:
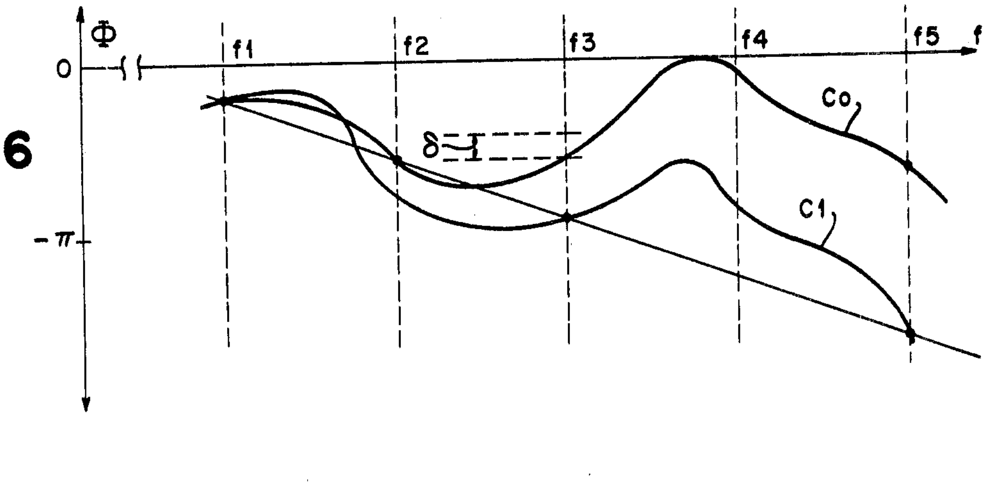
Figure 7:
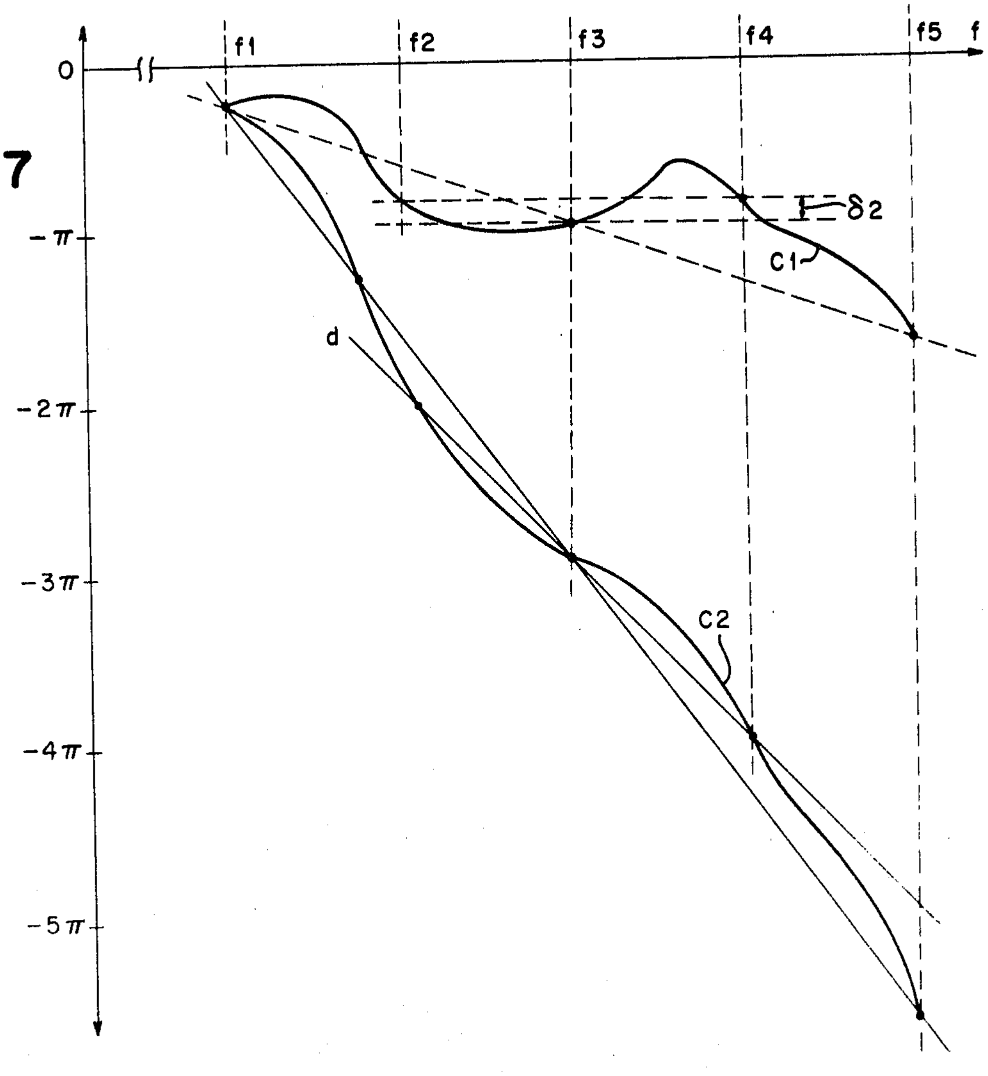
Figure 8:
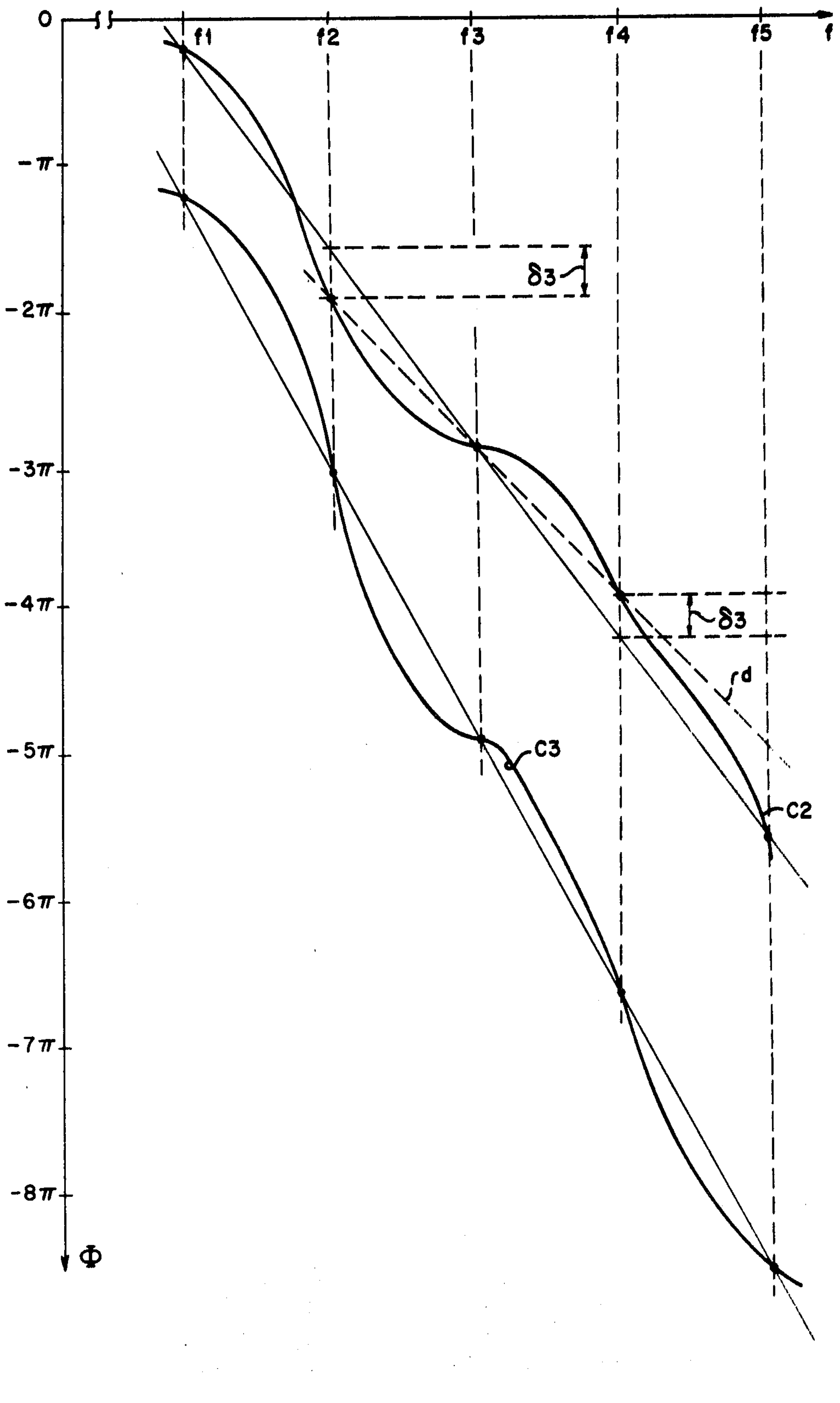

Referring now to FIGS. 6, 7, and 8, there are shown dynamic illustrations of the invention. Suppose the frequencies f1, f2, f3, f4, f5 and original phase curve Co define a transmission channel. One will align the value for f3 with the ones for f1 and f5 by using an order 3 stage. This will compensate shift δ1 and will have f1 and f5 as pivot points. Curve Cr δ1 of FIG. 3 corresponds to the filter stage where F1=1 and F2=f5. At the output of this stage, curve Co becomes curve C1 where points f1, f3, f5 are aligned.

The following operation consists in the alignment of points f2, f3, f4 independently of the alignment of points f1, f3, f5 which will be maintained in this operation. To align f2, f3, f4, it is enough to correct shift δ2, as shown on FIG. 7 on which we have plotted curve C1. This correction will be carried out by using a circuit having points f1, f3, f5 as pivots and showing a "symmetrical" phase shift. To perfect this alignment a compound odd order stage of order 3 and order 5 stages is used. Curve Cr δ2 of FIG. 4c is the curve which corresponds. At the output of this circuit, phase curve C1 becomes curve C2 (FIG. 7); the points corresponding to f1, f3, f5 are aligned, the points corresponding to f2, f3, f4 are also aligned with respect to line d. The points corresponding to f2 and f4 show, with respect to alignment f1, f3, f5, two respective shifts δ3 and –δ3, as shown in FIG. 8 where we have plotted curve C2. Thus, all the points will be aligned by correcting this shift with a filter stage having points $f1$, $f3$, $f5$ as pivots and giving an "antisymmetrical" type phase shift. It is exactly the case of the order 4 stage previously studied. Curve Cr δ3 in FIG. 5, gives the type of phase shift and the values of which, taken as an example, are the values corresponding to shift δ3. At the output of this stage, phase curve C2 becomes curve C3 (FIG. 8) where the points corresponding to $f1$, $f2$, $f3$, $f4$, $f5$ are aligned. The curve C3 has been substituted to curve Co by using an assembly composed of an order 3 stage, a group of order 3 and order 5 coupled stages and an order 4 stage. This is exactly the one shown in FIG. 2.

The evolution from Co to C3 was studied with the cells geographically placed in the same order as the operations carried out. In fact, one acts on the cells by testing the result at output S and the final result consists to obtain, at output S, curve C3 of FIG. 8, the typical points of which are plotted in FIG. 9. If this final result depends on the following of the operations, it does not depend on the geographical position of the circuits performing these operations. Suppose, for example, circuits I, II, and III following order II, III, I indicated in FIG. 9 which also gives various positions of the typical points of the phase curve at outputs S in accordance with the successive operations. Independently of any adjustment value, from the original phases at points E (points marked with a cross), the three circuits give, at the output for $f1$ and $f5$ which are the common extreme pivot points, the phase values at 10 and 11. On starting, taking into account the arbitrary original adjustments, the phase value for $f3$ is itself arbitrary. The first operation carried out is the action on circuit I which aligns at 12 this phase value with values 10 and 11. The following operation consists to act on circuit II and this operation should maintain alignment $f1$, $f3$, $f5$ which has been just obtained (we say that it transfers it) and is also going to align, on another line, points $f2$, $f3$, $f4$. Circuit II having points $f1$, $f3$, $f5$ as pivots, its action on the phases of these frequencies is independent of its adjustment. Thus the phases in E′ of frequencies $f1$, $f2$, $f5$ would not change; circuit III having also points $f1$, $f3$, $f5$ as pivots, the phases of these frequencies at E″ will not change. Thus, it appears that the action on II and the following action on III do not modify the adjustment just carried out at I, the phase of $f3$ remains aligned at 12. By acting on II, symmetrical modifications are applied to the phase of $f2$, and $f4$ in E′; III being unchanged. These modifications involve equivalent symmetrical modifications at E″, which in turn, involve symmetrical modifications at output S since I which has been adjusted remains unvariable. Then, one will act on II until obtainment at S of an alignment of the phases of $f2$, $f3$, and $f4$, the alignment of $f1$, $f3$, $f5$ being maintained as previously seen. At this time, it exists at S, the distribution 10, 12, 11 previously obtained and the distribution 14, 12, 15 which has just been obtained by acting on II. The, input E′ of circuit III receives $f1$, $f3$, $f5$, $f2$, $f4$ with well determined phases by acting on III. The phases of $f2$ and $f4$ at E″ are submitted to two antisymmetrical variations which will involve equivalent antisymmetrical variations at S, which cause the rotation of straight line 14, 12, 15 around 12. The positions of points 14, 15 being always the intersection of said straight line with vertical $f2$ and $f4$; one acts on III until points 14, 15 come to 16 and 17. At this time, the wanted alignment 10, 16, 12, 17, 11 is obtained which corresponds to curve C3 of FIG. 8.

This description of the present invention has been given as an example and it will be understood that various changes in form and details may be made therein without departing from the spirit and scope of the invention.

What is claimed is:

1. An equalizer for linearizing the phase-frequency response (FIG. 6 - $C_0$) of a transmission channel to an applied signal, the channel having a bandwidth containing preselected frequencies ($f_1 < f_2 < f_3 < f_4 < f_5$), the equalizer being characterized by successive all pass filter stages comprising at least:

first (FIG. 2 - ckt. I) and second (FIG. 2 - ckt. II) odd order filter stages for symmetrically phase shift aligning different respective groups of preselected frequencies (FIG. 6 - Δ1, $f_1, f_3, f_5$; FIG. 7 - Δ2, $f_2, f_3, f_4$), at least one frequency of each group being in common ($f_3$), to conform to predetermined linear phase - frequency approximations (C1, C2);

the first odd order filter including means for aligning an odd number of alternate ones of the preselected frequencies ($f_1, f_3, f_5$) as arranged in order of increasing magnitude, the second odd order filter including means for aligning an odd number of consecutive preselected frequencies ($f_2, f_3, f_4$) also arranged in order of increasing magnitude; and an even order filter stage (FIG. 2 - ckt. III) for antisymmetrically phase shift aligning the previously phase aligned frequency groups about their common frequency.

2. An equalizer for linearizing the phase - frequency response (FIG. 6 - $C_0$) of a transmission channel to an applied signal, the channel having a predetermined bandwidth ($f_1 < f_2 < f_3 < f_4 < f_5$), said equalizer being characterized by successive all-pass filter stages, each filter stage having its phase shift $\Delta\phi$ varying as $$\arctan\left[\frac{H(\omega)}{R}\,\frac{\pi_1{}^n(\omega^2-\omega_i{}^2)}{\pi_1{}^m(\omega^2-\omega_j{}^2)}\right]$$

where $n-m = 0$ for an even order phase shift, $n-m = 1$ for an odd order phase shift; and where $\omega = 2\pi F$, $\omega_i = 2\pi F_i$, and $\omega_j = 2\pi F_j$ being the angular frequencies denominated pivot points, subject to the condition that $(\Delta\phi)\ i = 2i\pi$ and $(\Delta\phi)j = (2j-1)$ and $(i, j = 1, 2, 3 \ldots)$, and $R$ being the real part of the filter stage transfer function $H(\omega)$;

the equalizer being further characterized by at least:

a first filter stage (FIG. 2 - ckt. I) for introducing an odd order phase shift (FIG. 6 - Δ1) to align a first group of frequencies ($f_1, f_3, f_5$) along a first linear phase - frequency approximation to yield a first intermediate response characteristic (c1);

a second filter stage (FIG. 2 ckt. II) for introducing an odd order phase shift (FIG. 7 - Δ2) to align a second group of frequencies ($f_2, f_3, f_4$,) along a second linear phase - frequency approximation (*d*) to yield a second intermediate response characteristic (c2); and a third filter stage (FIG. 2 - ckt. III) for introducing an even order phase shift (FIG. 8 - Δ3) to linearly align the first and second linear approximations to yield a final response characteristic (c3).

3. An equalizer according to claim 2, wherein the phase shift $\Delta\phi$ of the first filter stage (FIG. 3) varies as $$\left[\arctan m \frac{F^2-F_1^2}{F(F^2-F_2^2)}\right]$$

the pivot points $F_1$ and $F_2$ coinciding with the respective extremes of the first group of frequencies ($f_1$ and $f_5$).

4. An equalizer according to claim 3, wherein the phase shift $\Delta\phi$ of the second filter stage (FIG. 4c) varies as $$\arctan n\left[\frac{F^2-F_1'^2}{F(F^2-F_4'^2)}\right] + \arctan n\left[\frac{(F^2-F_1'^2)(F^2-F_3'^2)}{F(F^2-F_2'^2)(F^2-F_4'^2)}\right]$$

wherein the pivot points $F_1'$ and $F_3'$ coincide with the lower extreme ($f_1$) and an intermediate ($f_3$) frequency of the first group, $F_2'$ and $F_4'$ coincide with frequencies of the second group, and $m = kn$.

5. An equalizer according to claim 2, wherein each odd and even order filter stage respectively produces a symmetrical and antisymmetrical phase shift as measured from a corresponding linear phase - frequency approximation connecting at least extreme and intermediate frequencies of the respective group.

6. An equalizer according to claim 1, wherein the first and second odd order stages and the even order stage are permutatively arrangeable.

7. An equalizer according to claim 2, wherein the first and second odd order stages and the even order stage are permutatively arrangeable.

* * * * *